United States Patent [19]

Ibe et al.

[11] Patent Number: 5,003,212

[45] Date of Patent: Mar. 26, 1991

[54] MOLDED COMMUTATOR WITH A LAYER OF INSULATION ON THE BASE

[75] Inventors: Hiromitu Ibe, Kosai; Yoshimichi Shirai, Toyoake, both of Japan

[73] Assignee: Asmo Co., Ltd., Kosai, Japan

[21] Appl. No.: 417,494

[22] Filed: Oct. 5, 1989

[30] Foreign Application Priority Data

Oct. 7, 1988 [JP] Japan ............................... 63-251954

[51] Int. Cl.[5] ...................... H02K 13/04; H02K 15/12; H01R 39/16; H01R 39/04

[52] U.S. Cl. ...................................... 310/235; 310/45; 310/233; 310/236

[58] Field of Search ..................... 29/597; 310/45, 231, 310/233, 235, 236, 237, 234, 43

[56] References Cited

U.S. PATENT DOCUMENTS

| | | | |
|---|---|---|---|
| Re. 29,445 | 10/1977 | Nusser et al. | 310/43 |
| 2,541,047 | 2/1951 | Frisbie et al. | 310/235 |
| 2,674,784 | 4/1954 | Roberts et al. | 310/235 |
| 3,103,060 | 9/1963 | Fay | 310/235 |
| 3,168,868 | 2/1965 | Schultz | 310/233 |
| 3,171,999 | 3/1965 | Kemp | 310/45 |
| 3,471,731 | 10/1969 | Pratt et al. | 310/235 |
| 3,473,062 | 10/1969 | Forste et al. | 310/235 |
| 3,473,063 | 10/1969 | Forste et al. | 310/235 |
| 3,777,367 | 12/1973 | Kalagidis | 310/234 |
| 4,071,796 | 1/1978 | Nippert | 310/45 |
| 4,562,369 | 12/1985 | Gerlach et al. | 310/235 |
| 4,868,440 | 9/1989 | Gerlach et al. | 310/43 |

FOREIGN PATENT DOCUMENTS

| | | |
|---|---|---|
| 55-15948 | 4/1980 | Japan . |
| 209040 | 11/1984 | Japan . |
| 63-69446 | 3/1988 | Japan . |

*Primary Examiner*—Steven L. Stephan
*Assistant Examiner*—C. LaBalle
*Attorney, Agent, or Firm*—Burns, Doane, Swecker & Mathis

[57] ABSTRACT

An improved commutator for an electric motor and a method of making the same wherein the outer surface of a commutator sleeve molded of a synthetic resin is coated with an insulating coating layer of an electrically insulating coating material. The molded commutator sleeve thus coated is protected from oxidative degradation and cracking which would otherwise result in removal of a commutator bar and insulation failure.

6 Claims, 2 Drawing Sheets

MOLDED COMMUTATOR WITH A LAYER OF INSULATION ON THE BASE

BACKGROUND OF THE INVENTION

1. Field of the Invention

The present invention relates to a commutator for use in a rotating machine such as an electric motor and having a plurality of commutator segments or bars of a conductive material arranged around a sleeve molded of a thermosetting synthetic resin. It also relates to a method of making such a commutator.

2. Description of the Prior Art

Commutators are used in various rotating machines such as DC motors having brushes and they are composed of a plurality of commutator segments or bars arranged in a drumlike cylinder and supported by a commutator sleeve molded of a thermosetting synthetic resin, with air gaps or grooves defined between adjacent ones of the commutator bars and the outer periphery of the commutator sleeve. The sleeve has a finished central bore for accommodating the armature shaft.

In the manufacture of the commutators of the foregoing construction, it is customary practice to fill an internally and circumferentially grooved pipe of an electrically conductive material such as copper with a thermosetting synthetic resin, thereby forming a commutator blank. After the molded thermosetting synthetic resin is aged for dimensional stability, the central bore of the commutator blank is finished by reaming to correct a dimensional change which may have been caused by aging. Thereafter, the copper pipe is separated into a plurality of circumferentially spaced commutator segments or bars which are electrically separated from one another by undercuts or grooves defined between the adjacent ones of the commutator bars. Finally, the outer peripheral surface of the commutator blank is finished by cutting or turning so as to provide an improved commutation.

The commutator thus produced is assembled with the armature of a motor. When the motor is operating, the outer peripheral surface of the commutator is heated at a high temperature due mainly to the Joule heat resulting from the Joule effect produced by an electric current in the commutator bars and brushes bearing thereagainst, and the friction heat resulting from sliding contact between the commutator and the brushes. A part of the heat thus produced is transmitted from the commutator bars to the commutator sleeve and gradually deteriorates the thermosetting synthetic resin constituting the commutator sleeve. With this deterioration by heat, the commutator sleeve tends to create cracks in the reamed surface of the central bore and in the vicinity of the exposed surfaces between the adjacent commutator bars. The cracks thus created considerably lower the bonding strength between the commutator bars and the commutator sleeve and sometimes produce a step or difference in level between the adjacent commutator segments. Consequently, as the armature revolves, the brushes impinge against the stepped portion of the commutator and hence produce unpleasant vibration and noise and sparks during commutation. Under such condition, the brushes have only a short service life.

Various attempts have been made to overcome the foregoing problems. One such prior attempt is disclosed in Japanese Patent Publication No. 55-15948 in which the adjacent commutator bars are integrally connected by a special glass. Japanese Patent Laid-open Publication No. 59-209040 shows another prior attempt which involves the use of a commutator sleeve formed of a ceramic material instead of a resin material. According to a further attempt known from Japanese Patent Laid-open Publication No. 63-69446, a bushing adapted to be fitted over the armature shaft and commutator bars are integrally molded in concentric relation via an intermediate resin layer, with the bushing double-insulated from the resin layer.

The prior attempts disclosed in the first- and second-mentioned Japanese Publications are however still unsatisfactory in that the structure of the commutator and the process of making the commutator are rendered complicated because the commutator core is formed of a specific material other than the forming resin such as a thermosetting synthetic resin. The prior attempt according to the last-mentioned Japanese Publication has an advantage that the bushing is effective to prevent carbonization of the resin layer and leakage or insulation failure resulting from moisture absorption by the resin layer and various fillers. This attempt however still has a problem that the oxidative degradation of the molding resin and the cracking of the molding resin cannot be avoided.

SUMMARY OF THE INVENTION

With the foregoing difficulties in view, it is an object of the present invention to provide a commutator having commutator bars molded with a synthetic resin sleeve, which is capable of preventing oxidative degradation of the molding resin and moisture absorption by the molding resin, is free from cracking and has a large bond strength to keep the commutator bars in position against removal.

Another object of the present invention is to provide a commutator which can be assembled with the armature shaft with a large bond strength.

A further object of the present invention is to provide a method of making such commutator.

According to a first aspect of the present invention, there is provided a commutator of the type having a plurality of commutator bars formed of an electrically conductive material and firmly supported by and around a commutator sleeve molded of a synthetic resin, with insulating air gaps defined between the adjacent commutator bars, the molded commutator sleeve having a central bore for accommodating an armature shaft, wherein the improvement comprises an insulating coating layer of an electrically insulating coating material covering an exposed surface of the commutator sleeve.

According to a preferred embodiment, the insulating coating layer covers a peripheral surface of the central bore of the molded commutator sleeve. The insulating coating material is an epoxy resin.

According to a second aspect of the present invention, there is provided a method of making a commutator of the type having a plurality of commutator bars formed of an electrically conductive material and firmly supported by and around a commutator sleeve molded of a synthetic resin, with insulating air gaps defined between the adjacent commutator bars, the molded commutator sleeve having a central bore for accommodating an armature shaft, the method comprising the steps of:

(a) filling a pipe of an electrically conductive material with a molding resin, thereby forming a commutator blank having a central bore;

(b) surface-finishing the central bore to improve dimensional accuracy of the central bore;

(c) separating the pipe into a plurality of circumferentially spaced commutator bars with insulating air gaps defined between the adjacent commutator bars, thereby electrically separating the commutator bars; and (d) coating at least one of the surface-finished central bore and an exposed surface between each pair of adjacent commutator bars, with an electrically insulating coating material to form an insulating coating layer.

The coating may be achieved to cover the entire surface of the commutator. Alternatively, in the case where the coating is provided over the surface-finished central bore, the coating preferably is achieved at the same time when an armature shaft is fitted in the central bore. The coating material preferably is an epoxy resin.

According to a third aspect of the present invention, there is provided a method of making a commutator of the type having a plurality of commutator bars formed of an electrically conductive material and firmly supported by and around a commutator sleeve molded of a synthetic resin, with insulating air gaps defined between the adjacent commutator bars, the molded commutator sleeve having a central bore for accommodating an armature shaft, the method comprising the steps of:

(a) filling a pipe of an electrically conductive material with a molding resin, thereby forming a commutator blank having a central bore;

(b) surface-finishing the central bore to improve dimensional accuracy of the central bore;

(c) separating the pipe into a plurality of circumferentially spaced commutator bars with insulating air gaps defined between the adjacent commutator bars, thereby electrically separating the commutator bars;

(d) coating the entire surface of the thus-processed commutator blank with an electrically insulating coating material; and (e) removing the insulating coating from an outer peripheral surfaces of the respective commutator bars.

The insulating coating may be removed by turning the outer peripheral surfaces of the respective commutator bars.

Since the surface of the molding resin including the central bore and outer periphery of the commutator sleeve is covered with the insulating coating layer and hence is not exposed to air, the molding resin is protected from oxidative degradation, moisture absorption and cracking.

The coating material comprised of an epoxy resin provides a strong bond strength between the commutator and the armature shaft when it is applied to the peripheral surface of the central bore.

Since the peripheral surface of the central bore is coated with the insulating layer at the same time when the commutator is assembled with the armature shaft, the bond strength between the commutator and the armature shaft is enhanced and the manufacture of the armature assembly is simplified. Such a simultaneous coating is particularly useful when applied to a small-sized commutator.

The commutator may be coated with the insulating layer on its entire surface in which instance the outer periphery of the commutator is finished by turning or cutting to remove the insulating coating layer. This coating process is considerably simpler than a coating in which narrow portions of the commutator sleeve exposed between the adjacent commutator bars are coated.

The forming resin available for the commutator sleeve is preferably, but not limited to, a thermosetting resin.

In brief, the commutator according to the present invention is coated with an insulating layer of an electrically insulating coating material so that the central bore, end faces and outer peripheral surface portions of a molded commutator sleeve exposed between the adjacent commutator bars are fully concealed from the outside air. Thus, a molding resin constituting the commutator sleeve is protected from oxidative degradation and cracking, and provides an increased bond strength between the commutator bars and the commutator sleeve and also between the commutator sleeve and the armature shaft. With the provision of the insulating coating layer, the molded commutator sleeve is free from cracking and hence the outer peripheral surface of the commutator is always kept smooth and free from a local step which would otherwise be caused by the cracking. The smooth peripheral surface provides a long brush life and improved commutation efficiency. The insulating coating layer further provides an enhanced bond strength between the commutator and the armature shaft when it is applied at the time of assembling of the commutator and the armature shaft.

As appears clear from the foregoing description, the commutator according to the present invention is highly reliable in operation.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

Figure 1A:
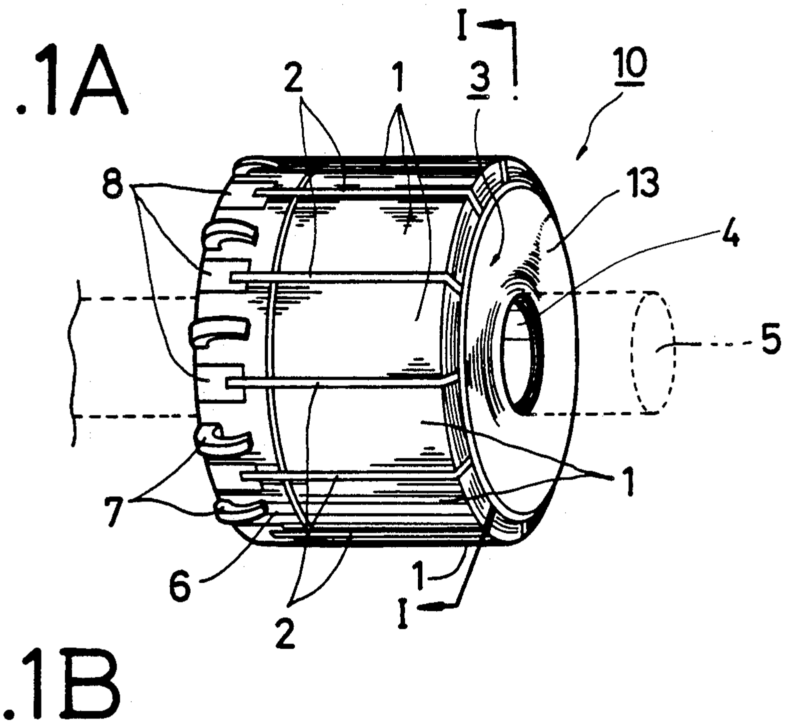
FIG. 1A is a perspective view of a commutator according to the present invention.

Referring to the drawings, wherein like reference characters designate like or corresponding parts throughout the several views, FIG. 1A illustrates a commutator 10 according to the present invention. The illustrated commutator 10 is of the type having risers 6 for connecting commutator segments or bars to coils of the armature of an electric motor. The commutator 10 includes a plurality of commutator segments or bars 1 arranged in drum like cylinder shape and firmly supported by a commutator core or sleeve 3 molded of a thermosetting synthetic resin, with insulating air gaps or undercut grooves 2 defined between adjacent ones of the commutator bars 1 and the outer periphery of the commutator sleeve 3. The molded commutator sleeve 3 has a central bore 4 accommodating an armature shaft 5 indicted by the broken lines. Each of the risers 6 has a riser prong 7 for connection to an armature coil. The molded commutator sleeve 3 has a plurality of circumferentially spaced radial projections 8 disposed between the adjacent risers 6 in alignment with the respective air gaps 2.

Figure 1B:
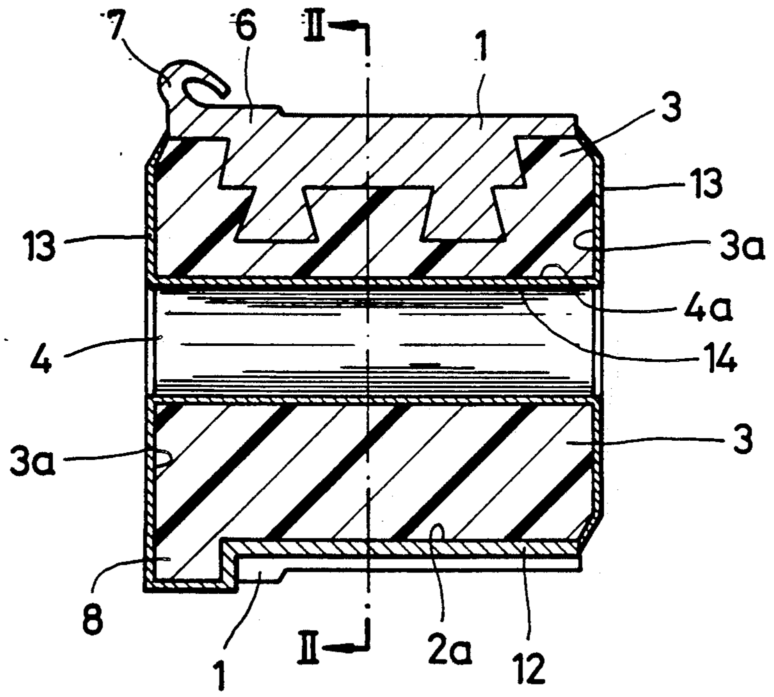
FIG. 1B is a cross-sectional view taken along line I—II of FIG. 1A.
Figure 1C:
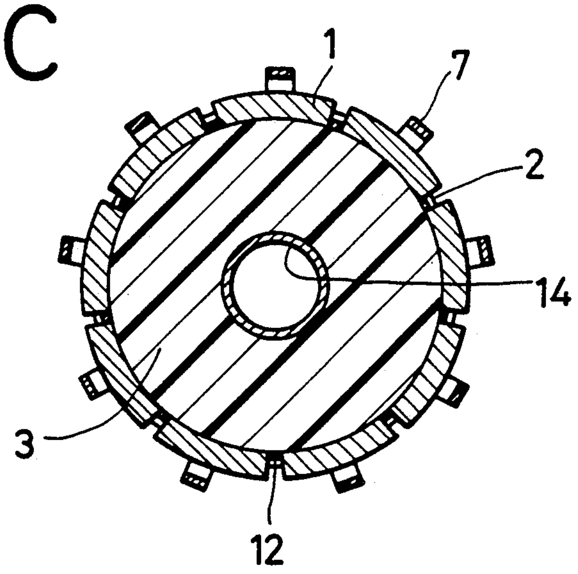
FIG. 1C is a cross-sectional view taken along line II—II of FIG. 1B.

The molded commutator sleeve 3 is coated on its exposed surface portions with insulating coating layers 12, 13, 14 of an electrically insulating coating material. As shown in FIG. 1B, the insulating coating layer 12 covers an outer peripheral surface portion 2*a* of the molded commutator sleeve 3 which is exposed between each pair of the adjacent commutator bars 1. The radial projection 8 contiguous to the surface portion 2*a* is also coated with the insulating coating layer 12. The insulating coating layers 13, 13 cover opposite end faces 3*a*, 3*a* of the molded commutator sleeve 3. The insulating coating layer 14 covers an inner peripheral surface of the molded commutator sleeve 3 which defines the central bore 4.

Eligible substances for the electrically insulating coating material include an epoxy resin, a fluorine plastics and a silicone resin that have an excellent electrical insulating properties. More specifically, a particularly appropriate epoxy coating material comprises Epikote 828 in an amount of 60 parts by weight ("Epikote 828" is a tradename and manufactured by Yuka Shell Epoxy K.K.), DER 732 in an amount of 40 parts by weight ("DER 732" is a tradename and manufactured by Dow Chemical Japan Ltd.), and Epomate N001 in an amount of 50 parts by weight ("Epomate N001 is a tradename and manufactured by Ajinomoto Co., Ltd). Another suitable epoxy coating material is commercially available under the tradename "Three Bond 2901" manufactured by Three bond Co., Ltd. The fluorine coating materials include "Fluorocoat EC-104" which is a tradename and manufactured by Asahi Glass Co., Ltd. A particularly appropriate silicone coating material comprises "Three Bond SE-9156" which is a tradename and manufactured by Three Bond Co., Ltd. The insulating coating material may include a ultraviolet-curing resin, one example of which is available under the tradename "Multi-Cure 625" manufactured by Toyo Ink Mfg. Co., Ltd.

Among others, the epoxy coating material having adhesion properties is particularly advantageous in that when the armature shaft 5 is press-fitted in the central bore 4 of the commutator sleeve 3, the adhesive epoxy coating material applied over the peripheral surface of the central bore 4 will enhance the bond strength between the armature shaft 5 and the commutator sleeve 3.

In the commutator 10 described above, the sleeve 3 is entirely coated with the insulating coating layer 12, 13, 14. A desired result can be obtained when the insulating coating layer is provided only over the peripheral surface of the central bore 4 or the outer peripheral surface portions 2*a* corresponding in position to the undercut grooves 2.

The commutator of the foregoing construction is manufactured in the manner as described below.

A preferred method of forming the commutator 10 will now be described. A pipe formed of an electrically conductive material such as copper and having a broached hole and circumferential grooves in its inner peripheral surface is filled with a molding resin such as a thermosetting synthetic resin to thereby form a commutator blank having a central hole. The commutator blank is composed of a pipe firmly supported retained on a commutator sleeve 3 of molded of thermosetting synthetic resin.

Then, the commutator blank is aged under prescribed conditions for dimensionally stabilizing the molded commutator sleeve 3.

The central hole of the aged commutator blank is finished by reaming so as to have the same diameter as the central hole of a commutator prior to being coated with the insulating coating layer. Then, the pipe is separated into a plurality of circumferentially spaced commutator segments or bars 1, with insulating air gaps or undercut grooves 2 defined between adjacent ones of the commutator bars 1. With the air gaps thus provided, the individual commutator bars 1 are electrically insulated from one another. The commutator blank has thus been processed into a commutator which is substantially the same as the commutator 10 shown in FIG. 1A except for the insulating coating layers 12–14.

Then, the commutator is subjected to a coating process in which all the exposed surfaces of the commutator sleeve 3 are coated with an insulating coating layer 12, 13, 14 of an electrically insulating coating material, the exposed surfaces including outer peripheral surface portions 2*a* corresponding in position to the respective undercut grooves 2, opposite end faces 3*a*, 3*a* and the peripheral surface 4*a* of the central bore 4.

The commutator 10 thus coated is then assembled with the armature of a motor by press-fitting an armature shaft 5 into the coated central bore 4 of the commutator 10.

The formation of the undercut grooves 2 may be retarded until after the commutator bars 1 have been connected via risers 6 to coils on the armature.

Figure 2:
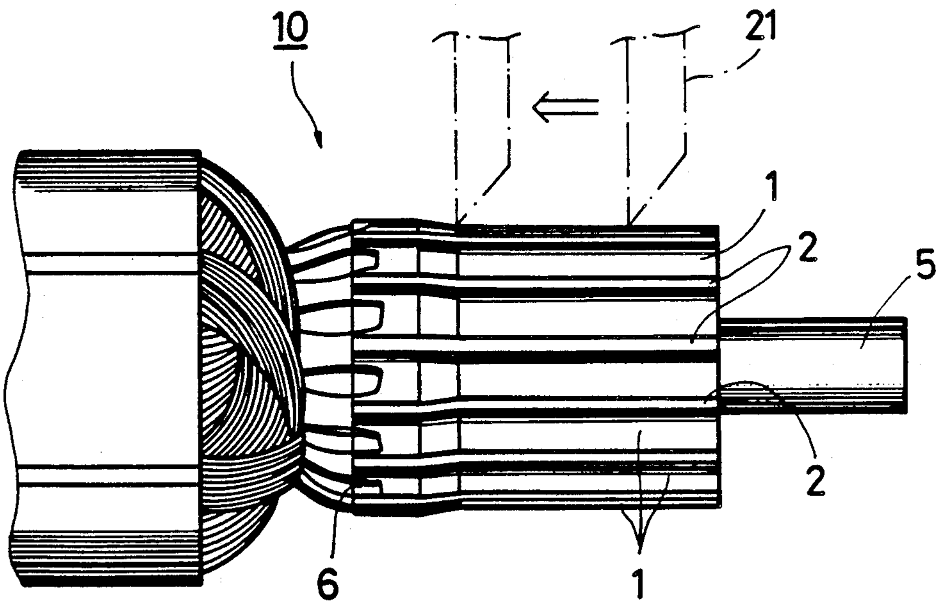
FIG. 2 is a plan view of a commutator illustrative of a surface-finishing step according to the present invention.

Thereafter, the outer peripheral surface of the commutator 10 is finished by turning or cutting with a cutting tool 21, as shown in FIG. 2. The outer peripheral surface thus finished is free from impurity and has an accurate roundness and an excellent smoothness that provide an improved commutation.

The above-mentioned coating step preferably is made by dipping the commutator into a bath of the electrically insulating coating material so that the commutator is coated on its entire surface with the insulating coating material. Such a coating process is extremely simple as compared to the coating of the outer peripheral surface portions 2*a* of the commutator sleeve 3. A further advantage is that the coating material filled in the undercut grooves 2 is effective to prevent formation of burrs which would otherwise occur at the longitudinal edges of the commutator bars when the outer peripheral surface of the commutator is finished with the cutting tool 21. With this burr-free finishing of the outer peripheral surface, a possibility of insulation failure is substantially eliminated.

The following examples are given to further illustrate preferred operations within the scope of the present invention.

INVENTIVE EXAMPLE 1

A broached, internally and circumferentially grooved copper pipe was filled with a thermosetting synthetic resin available under the tradename "RX 862" manufactured by Otalite Co., Ltd. A commutator blank thus formed had a cylindrical commutator sleeve having an outside diameter of 20 mm, an inside diameter of 10 mm and a length of 16 mm. Then, commutator blank was aged at 180° C. for 8 hours.

The central hole of the aged commutator blank was finished with a reamer to have a diameter of 11 mm. The peripheral surface of the reamed central bore was coated with an insulating layer of an epoxy coating material such as one comprised of Epikote 826 in an amount of 60 parts by weight ("Epikote 828" is a tradename and manufactured by Yuka Shell Epoxy K.K.), DER 732 in an amount of 40 parts by weight ("DER 732" is a tradename and manufactured by Dow Chemical Japan Ltd.), and Epomate N001 in an amount of 50 parts by weight ("Epomate N001 is a tradename and manufactured by Ajinomoto Co., Ltd). The coated insulating coating layer was dried by heating at 150° C. for 15 min.

INVENTIVE EXAMPLE 2

A commutator blank was formulated in accordance with a same procedure as Inventive Example 1 stated above, except that an insulating coating layer was formed by coating the reamed bore surface with a ultraviolet-curing resin such as one available under the tradename "Multi-Cure 625" manufactured by Toyo Ink Mfg. Co., Ltd. The coated layer was cured by irradiating ultraviolet ray for 1 mm by means of a ultraviolet lamp (available under the tradename "PC-2UV" manufactured by Dymax Co., Ltd.).

Comparative Example

A commutator blank of the same size as one prepared in accordance with Inventive Example 1 and having a reamed bore surface left uncoated was prepared.

A test sample I consisted of the commutator blank of Inventive Example 1 and a test sample II consisted of the commutator blank of Comparative Example were disposed in an oven heated at 250° C. for 196 hours. Then the loss in weight on heating was determined with respect to each of the test samples, the number of each test sample being four. The test results are shown in Table 1 in terms of mean value.

TABLE 1

| | Test Sample I with Coating | Test Sample II without Coating |
|---|---|---|
| Loss in Weight | 6.25% | 7.35%. |

As appears clear from Table 1, the loss in weight of the coated test sample according to Inventive Example 1 is smaller by about 1% than that of the uncoated test sample according to Comparative Example. This means that the commutator of the present invention is resistant to weight change.

Test samples I and II stated above and a test sample III consisted of the commutator blanks of Inventive Example 2 were disposed in an oven heated at 300° C. for 24 hours, the number of each test sample being three. Then, the number of cracks appearing in the reamed bore surface of each test sample was observed with a 8-power magnifying glass with the results tabulated in Table 2.

TABLE 2

| | Test Sample I (Coated) | Test Sample II (Uncoated) | Test Sample III (Coated) |
|---|---|---|---|
| Number of Cracks | 0 | 16 | 5 |

Table 2 demonstrates the fact that the test sample I of Inventive Example 1 is quite satisfactory because no crack was found. The test sample III of Inventive Example 2 is also satisfactory because the number of cracks is about one-third of that of the test sample II of Comparative Example.

EXAMPLE 1

Numerous test samples each having a molded commutator sleeve filled in a copper pipe and having an inside diameter of 10 mm, an outside diameter of 20 mm and a length of 16 mm were prepared in the same manner as done with Inventive Example I, followed by aging at 180° C. for 8 hours. The test samples were coated on their inner peripheral surfaces with an epoxy resin ("Thee Bone 2901"), a fluorine plastics ("Fluorocoat EC-104") and a silicone resin ("Three Bond SE-9156"). The coated test samples were disposed in an oven heated at 250° C. for 345 hours. Then, the number of cracks per test sample and the loss in weight were tested with the results shown in Table 3.

TABLE 3

| Type of | Number of cracks | | Loss in Weight (%) | |
|---|---|---|---|---|
| Coating | Coated | Uncoated | Coated | Uncoated |
| Epoxy | 3 | 36 | 4.3 | 17.0 |
| Fluorine | 2 | 43 | 4.4 | 17.6 |
| Silicone | 3 | 50 | 9.1 | 15.9 |

As appears clear from Table 3, the number of cracks of the coated test samples is about 1/10 to about 1/21 of that of the uncoated test samples and the loss in weight of the coated test samples is about ¼ to about ½ of that of the uncoated test samples. This means that the coating is noticeably effective to prevent the commutator from cracking and causing insulation failure.

EXAMPLE 2

A commutator having an outside diameter of 5 mm, an inside diameter of 2 mm and a length of 5 mm was prepared, then mounted on an armature shaft in accordance with an inventive mounting method and a conventional mounting method as described below. The number of samples employed for each mounting method was ten.

Inventive Mounting Method

The commutator was coated on its central bore with an epoxy coating resin comprised of Epikote 826 in an amount of 60 parts by weight, DER 732 in an amount of 40 parts by weight, and Epomate N001 in an amount of 50 parts by weight. Then an armature shaft having an outside diameter same as the inside diameter of the central bore of the commutator was fitted in the coated central bore to thereby assemble the commutator and the armature shaft, followed by heating at 150° C. for 15 min. to cure the coating.

Conventional Mounting Method

An armature shaft having a roughened peripheral surface was press-fitted in the central bore of the commutator to thereby mount the commutator on the aramature shaft.

The bond strength between the commutator and the armature shaft was measured with the results shown in Table 4.

TABLE 4

| | Inventive Mounting Method | Conventional Mounting Method |
|---|---|---|
| Bonding Strength | 80 Kgf | 4 Kgf |

Table 4 demonstrates the fact that the bond strength is enhanced by the inventive mounting method by 20 times that obtained by the conventional mounting method.

Obviously, various modifications and variations of the present invention are possible in the light of the above teaching. It is therefore to be understood that within the scope of the appended claims the invention may be practiced otherwise than as specifically described.

What is claimed is:

1. A commutator comprising a plurality of commutator bars formed of an electrically conductive material and firmly supported by and around a commutator sleeve molded of a synthetic resin, with insulating air gaps defined between adjacent ones of the commutator bars, the molded commutator sleeve having opposite side faces and a central bore extending through the sleeve from one of said side faces to the other for accommodating an armature shaft, an insulating coating layer of an electrically insulating coating material covering an exposed surface of the commutator sleeve, the insulating coating layer including a first portion covering a peripheral surface of the central bore of said molded commutator sleeve, and second portions contiguous to the first portion and covering the opposite side faces of the molded commutator sleeve.

2. A commutator according to claim 1 in combination with the armature shaft, the insulating coating layer comprising a resin whereby the first portion of the insulating coating layer bonds the armature shaft to the commutator sleeve.

3. A commutator according to claim 1, wherein the insulating coating layer further includes third portions contiguous to the second portions and covering an exposed outer peripheral surfaces of the molded commutator sleeve extending between pairs of adjacent commutator bars coextensively with each insulating air gap.

4. A commutator according to claim 3, wherein the insulating coating layer comprises a resin whereby the third portions thereof bond the commutator sleeve to the commutator bars.

5. A commutator according to claim 4 in combination with the armature shaft, whereby the first portion of the insulating coating layer bonds the armature shaft to the commutator sleeve.

6. A commutator according to claim 1, wherein the insulating coating material consists of an epoxy resin.

* * * * *